(12) United States Patent
Luharuka et al.

(10) Patent No.: US 8,220,777 B2
(45) Date of Patent: Jul. 17, 2012

(54) COMPLIANT ROTARY MECHANISM AND METHOD

(75) Inventors: Rajesh Luharuka, Atlanta, GA (US); Peter J. Hesketh, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1207 days.

(21) Appl. No.: 11/380,448

(22) Filed: Apr. 27, 2006

(65) Prior Publication Data
US 2006/0254362 A1 Nov. 16, 2006

Related U.S. Application Data

(60) Provisional application No. 60/676,424, filed on Apr. 29, 2005.

(51) Int. Cl.
*F16K 31/02* (2006.01)
(52) U.S. Cl. ............... 251/129.11; 251/313; 310/309
(58) Field of Classification Search ............. 73/649, 73/650; 137/625.33, 625.34, 625.46; 310/306, 310/309, 377; 251/129.01, 129.02
See application file for complete search history.

(56) References Cited

U.S. PATENT DOCUMENTS

| | | | | |
|---|---|---|---|---|
| 3,938,401 A | * | 2/1976 | Bauer | 74/471 R |
| 5,191,251 A | * | 3/1993 | Paratte | 310/309 |
| 5,266,859 A | * | 11/1993 | Stanley | 310/216.012 |
| 5,867,302 A | * | 2/1999 | Fleming | 359/291 |
| 6,137,206 A | * | 10/2000 | Hill | 310/306 |
| 6,313,562 B1 | * | 11/2001 | Barnes et al. | 310/306 |
| 6,592,098 B2 | | 7/2003 | Kao et al. | |
| 6,995,313 B1 | * | 2/2006 | Barnett et al. | 174/5 R |

FOREIGN PATENT DOCUMENTS
WO      WO 01/09520 A1 * 2/2001

OTHER PUBLICATIONS

D. Bosch, et al., "A silicon microvalve with combined electromagnetic/electrostatic actuation", Sensors and Actuators A (Physical), vol. A37-A38, pp. 684-692, Elsevier Sequoia—1993.
A.D. Khazan, "Transducers and Their Elements: Design and Application", Chap. 3 / Capacitive and Inductive Elements, pp. 152, PTR Prentice Hall, NJ, 1994.
C.H. Ahn, et al., "Fluid Micropumps Based on Rotary Magnetic Actuators", pp. 408-412, IEEE—1995.
Z. Nami, et al., "An energy-based design criterion for magnetic microactuators", Journal of Micromechanics and Microengineering, vol. 6, pp. 337-344, IOP Publishing Ltd.—1996.
C.H. Ahn, et al., "Micromachined Planar Inductors on Silicon Wafers for MEMS Applications", IEEE Transactions on Industrial Electronics, vol. 45, No. 6, pp. 866-876, IEEE Transactions—Dec. 1998.

(Continued)

*Primary Examiner* — John Fristoe, Jr.
*Assistant Examiner* — Andrew J Rost
(74) *Attorney, Agent, or Firm* — Thomas, Kayden, Horstemeyer & Risley, LLP

(57) ABSTRACT

Disclosed are various systems and methods to generate rotary motion. In one embodiment, a system is provided, which comprises one or more anchors, and a mass configured for rotary motion. Also, one or more compliant two-position mechanisms are attached to the mass and to the one or more anchors. The compliant two-position mechanisms restrict the rotary motion of the mass from a first angular position to a second angular position.

22 Claims, 7 Drawing Sheets

OTHER PUBLICATIONS

M. Walters, et al., "A Silicon Micromachined Gate Valve", Solid State Sensors and Actuators Workshop, 2 pages, Hilton Head, N.C., 1998.

S. Kota, et al., "Tailoring Unconventional Actuators Using Compliant Transmissions: Design Methods and Applications", IEEE/ASME Transactions on Mechatronics, vol. 4, No. 4, pp. 396-408, IEEE Dec. 1999.

David W. Plummer, et al., The Recodable Locking Device, Communications of the ACM, vol. 42, No. 7, pp. 83-87, Jul. 1999.

L.L. Howell, "Compliant Mechanisms", Chapter: Use of Commercial Mechanism Analysis Software, pp. 202-205, New York: Wiley, 2001.

N.D. Masters, et al., "A Three Degree of Freedom Pseudo-Rigid-Body Model for the Design of a Fully Compliant Bistable Micromechanism", presented at 27th Biennial Mechanisms and Robotics Conference, 10 pages, Sep. 29-Oct. 2, 2002, Montreal, Quebec, Canada, 2002.

T. Gomm, et al., "In-plane Linear displacement bistable microrelay", Journal of Micromechanics and Microengineering, vol. 12, pp. 257-264, IEEE—Mar. 2002.

M.S. Baker, et al., "On-Chip Actuation of an In-Plane Compliant Bistable Micromechanism", Journal of Microelectromechanical Systems, vol. 11, No. 5, pp. 566,573, IEEE—Oct. 2002.

B.E. Volland, et al., "Electrostatically driven microgripper", Microelectronic Engineering, vol. 61-62, pp. 1015-1023, Elsevier Science—2002.

N.D. Masters, et al., "A Self-Retracting Fully Compliant Bistable Micromechanism", Journal of Microelectromechanical Systems, vol. 12, No. 3, pp. 273-280, IEEE—Jun. 2003.

Elisabeth Smela, "Conjugated Polymer Actuators for Biomedical Applications" Advanced Materials, vol. 15, No. 6, pp. 481-494, Wiley-VCH—Mar. 2003.

C-N.C. Wong, et al., "Investigating the Thermal Response of a Micro-Optical Shutter", IEEE Transactions on Components and Packaging Technologies, vol. 26, No. 2, pp. 324-331, IEEE—Jun. 2003.

H. Ishii, et al., "SMA actuated compliant bistable mechanisms", Mechatronics, vol. 14, pp. 421-437, Elsevier Ltd.—2004.

N.D. Masters, et al., "A Three Degree-of-Freedom Model for Self-Retracting Fully Compliant Bistable Micromechanisms", J. Mech. Des. vol. 127, pp. 739-744, ASME Jul. 2005.

* cited by examiner

COMPLIANT ROTARY MECHANISM AND METHOD

CROSS REFERENCE TO RELATED APPLICATIONS

This application claims priority to U.S. Provisional Patent Application entitled "Electromagnetic Microvalve with Rotational Bistable Positions" filed on Apr. 29, 2005 and assigned application Ser. No. 60/676,424, which is incorporated herein by reference.

BACKGROUND

Micromechanisms are an important component of numerous Micro Electro-Mechanical Systems (MEMS) devices and are often integrated with an actuation system to achieve desired on-chip motion. In a typical case, micromechanisms are configured to generate linear motion of components. For example, such devices may comprise a microcantilever used in a variety of applications such as sensing force in atomic force microscopy, radio frequency switches, and thermomechanical data storage. Unfortunately, the mechanical displacement of such linear devices is typically limited.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
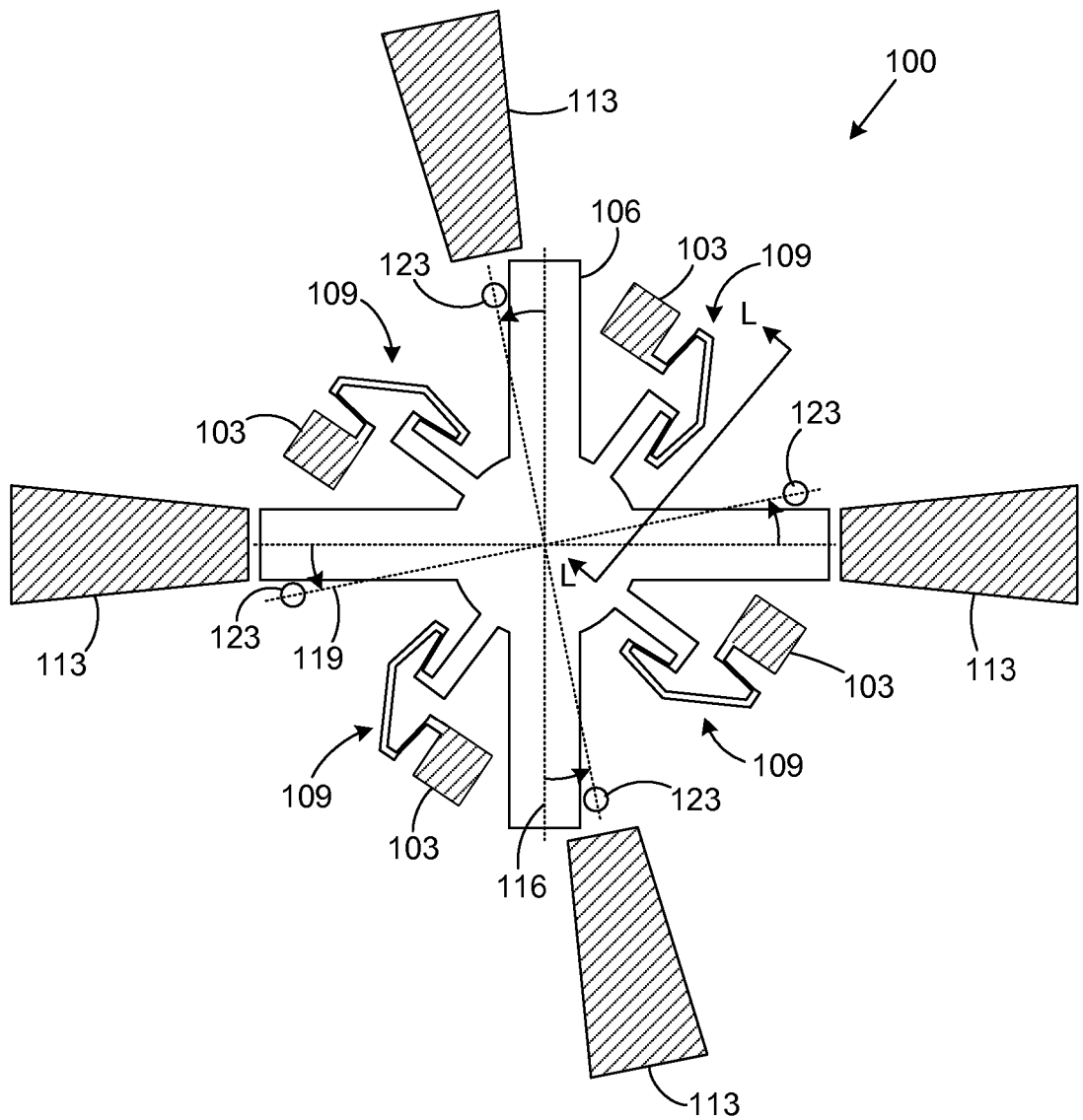
FIG. 1 is a drawing of a rotary motion system that includes a mass attached to a plurality of anchors using compliant two-position mechanisms according to an embodiment of the present invention.

Referring to FIG. 1, shown is a compliant rotary mechanism according to an embodiment of the present invention. The compliant rotary mechanism 100 is constructed, for example, upon a substrate that may comprise, for example, silicon, glass, plastics, metals, semiconductor materials, or other materials as can be appreciated. In this respect, the shaded portions of the compliant rotary mechanism 100 are affixed to or are part of the substrate as can be appreciated.

The compliant rotary mechanism 100 includes anchors 103 that either are attached to, or extend out of the substrate. In addition, the compliant rotary mechanism 100 includes a mass 106. In the embodiment of FIG. 1, the mass 106 is shown in the shape of a cross with a center disc, although the mass 106 may actually be in the form of any shape depending upon design consideration. The mass 106 is suspended above the substrate to which the anchors 103 are attached or of which the anchors 103 are a part. In order to suspend the mass 106 above the substrate, the mass 106 is attached to the anchors 103 by way of compliant two-position mechanisms 109. In addition, the compliant rotary mechanism 100 includes posts 113 that are employed to actuate a rotary motion of the compliant rotary mechanism 100 according to an embodiment of the present invention.

The compliant rotary mechanism 100 is configured to rotate between a first angular position 116 and a second angular position 119. In this respect, the compliant rotary mechanism 100 can rotate from the first angular position 116 to the second angular position 119 and vice versa. According to one embodiment, the compliant rotary mechanism 100 is employed to open and close ports 123 in order to control the flow of fluid through the ports 123. In particular, in an embodiment depicted in FIG. 1, the compliant rotary mechanism 100 closes the ports 123 when in the second angular position 119, and opens the ports 123 when the compliant rotary mechanism is in the first angular position 116. It is understood, however, that the ports 123 may be closed when the compliant rotary mechanism 100 is in either the first or the second angular positions 116 and 119 depending on the particular design.

In addition, the ports 123 are "closed" by virtue of the fact that the mass 106 is positioned over the ports and impedes the progress of any fluid that flows out of the ports 123. However, positioning the mass 106 as such may not completely seal off the ports 123 as can be appreciated. While the compliant rotary mechanism 100 is shown as being employed to open and close the ports 123 as depicted in FIG. 1, it is understood that the compliant rotary mechanism 100 may also be employed for purpose other than the opening and closing of the ports 123 as will be described, where the opening and closing of the ports 123 is discussed as one example of a use of the compliant rotary mechanism 100.

The compliant two-position mechanisms 109 are "compliant" in that they accomplish all motion from the deflection of flexible lengths that are connected at fixed joints. Compliant mechanisms are thus advantageous in that they are easier to microfabricate and present reduced wear and high precision of motion. The compliant two-position mechanisms 109 may be, for example, bi-stable, stable/quasi-stable, and stable/unstable. As contemplated herein, the term "stable" refers to a state of the compliant two-position mechanisms 109 in which they are resistant to a change of position and maintain equilibrium except for the application of a deliberate force of sufficient magnitude to cause the compliant two-position mechanisms 109 to leave a stable state and rotate to a different angular position.

The compliant two-position mechanisms 109 may be employed in a bi-stable configuration such that they have two separate positions in which they are stable and maintain equilibrium. A "quasi-stable" state is one in which the compliant two-position mechanisms are on the verge of instability, where very little force causes them to move to a second position. In this respect, in the quasi-stable state the compliant two-position mechanisms 109 are much less resistant to a change of position. The compliant two-position mechanisms 109 maybe in the quasi-stable state, for example, when the mass is rotated to an angular position located near the center of the first and second angular positions 116 and 119. The compliant two-position mechanisms 109 are "unstable" when they will naturally move in a given direction absent the application of a counter force to hold the compliant two-position in place.

As shown with respect to FIG. 1, the compliant rotary mechanism 100 is bi-stable in nature, as the compliant two-position mechanisms 109 employed therein are stable in either the first or the second angular positions. Alternatively, a stop may be included that impedes the rotary motion of the mass 106, where the mass 106 abuts against the stop. In this respect, the stop may be placed at an angular position near the center of the first and second angular positions so that the compliant two-position mechanisms 109 may be placed in a quasi-stable state when the mass 106 abuts the stop. In such situation, it may take very little force for the mass 106 to leave such a position and revert back to one of the first and second angular positions 116 or 119, depending upon which angular position 116 or 199 is opposite the stop. Given that such little force is necessary to move the mass 106 out of the quasi-stable state, then the compliant rotary mechanism 100 may thus be employed to detect vibration, for example, assuming that the vibration would provide enough force for the mass 106 to leave the quasi-stable state.

In addition, the compliant rotary mechanism 100 may be in an unstable state when against the abutments described above with respect to the quasi-stable state. As such, a force applied by virtue of the posts 113 may push the mass 106 against the stop and hold it there in an unstable state until the force is released thereby causing the mass 106 to fall back into a stable one of the first or second angular positions 116 or 119. Alternatively, the first or second angular positions 116 or 119 may be at a quasi-stable or unstable position in accordance with the above discussion.

In one embodiment, the compliant two-position mechanisms 109 are arranged in a cyclically symmetry geometry relative to a center of rotation of the mass 106. The cyclical symmetric geometry in which the compliant two-position mechanisms 109 are arranged substantially constrains the mass 106 in all degrees of freedom except for in-plane rotational motion. The relative stiffness of the compliant rotary mechanism 100 in the various degrees of freedom is further illustrated in example that is discussed in later text.

In addition, in the compliant rotary mechanism 100, the compliant two-position mechanisms 109 are positioned outside of an external perimeter of the mass 106. Nonetheless, it is possible that the compliant two-position mechanisms 109 may be positioned inside an internal opening defined in the mass 106, or in a layer that is adjacent to the layer within which the mass 106 is suspended.

The behavior of the two-position compliant mechanisms 109 may be modeled using nonlinear finite element methods. However, a less computationally intensive approach to model the two-position compliant mechanisms 109 is the pseudo-rigid-body model (PRBM) as can be appreciated. For further discussion of the modeling of compliant mechanisms 109 as described herein, reference is made to Howell, L. L., *Compliant Mechanisms*, New York: Wiley, 2001, which is incorporated herein by reference.

Figure 2:
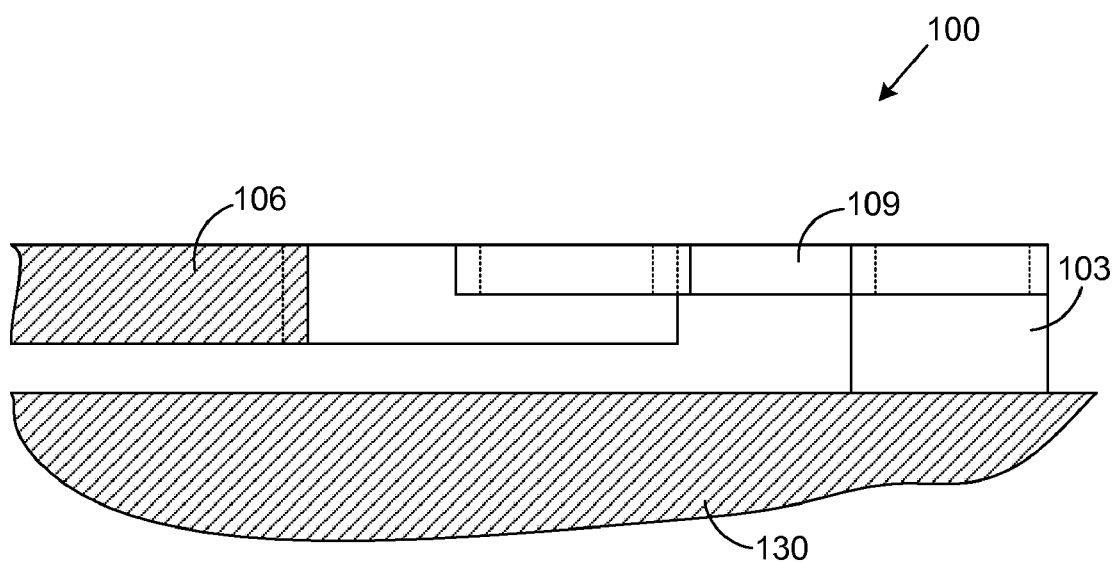
FIG. 2 is a sectional view of a portion of the rotary motion system of FIG. 1 that illustrates the suspension of the mass using the compliant two-position mechanisms according to an embodiment of the present invention.

Referring next to FIG. 2, shown is a section view of a portion of the compliant rotary mechanism 100 taken across section lines L-L depicted in FIG. 1 according to an embodiment of the present invention. As shown, an anchor 103 is coupled to the compliant two-position mechanism 109. The mass 106 is in turn coupled to the compliant two-position mechanism 109. The mass 106 is coupled to each one of the remaining compliant two-position mechanisms 109 in a similar manner, thereby suspending the mass 106 above the substrate 130 according to an embodiment of the present invention. In addition, various layers may be placed above the compliant rotary mechanism 100, where the compliant rotary mechanism 100 is between such layers and the substrate 130 as can be appreciated.

Alternatively, the anchor 103 and the compliant two-position mechanism 109 may be located in a layer that is adjacent to the layer within which the mass 106 is suspended. In this respect, the mass 106 may include protrusions that extend into layers adjacent to the layer within which the mass 106 is located so as to couple with the compliant two-position mechanisms 109 disposed in an adjacent layer.

With reference back to FIG. 1, in one embodiment, the posts 113 are arranged in pairs that diametrically oppose each other relative to a center of rotation of a mass 106. In the design shown, the mass 106 is configured to include fingers that extend from a center of the mass 106. Actuation of the posts 113 ultimately causes the mass 106 to rotate from a first one of the first and second angular positions 116/119 to a second one of the first and second angular positions 116/119. In this respect, the posts 113 may be actuated by applying a magnetic field or an electrostatic field to respective posts 113 that travels through the mass 106. For example, where a magnetic field is applied, to the posts 113, the mass 106 would rotate so as to allow the magnetic field to travel there through, thereby minimizing the reluctance of the system.

Alternatively, the mass may be coupled to a mechanical structure that undergoes thermal expansion, thereby causing the rotary motion of the mass 106 between the first and second angular positions 116/119. In the additional alternative, the mass 106 itself may undergo thermal expansion, thereby resulting in the rotation of the mass 106 between the first and second angular positions 116/119. Still further, other means may be employed to apply a force to the mass to cause rotation of the mass 106 between the first and second angular positions 116/119, such as, for example, the use of surface tension, use of a chemical reaction, or use of mechanical actuator, such as a pin that is coupled to a push button or other device.

Figure 3:
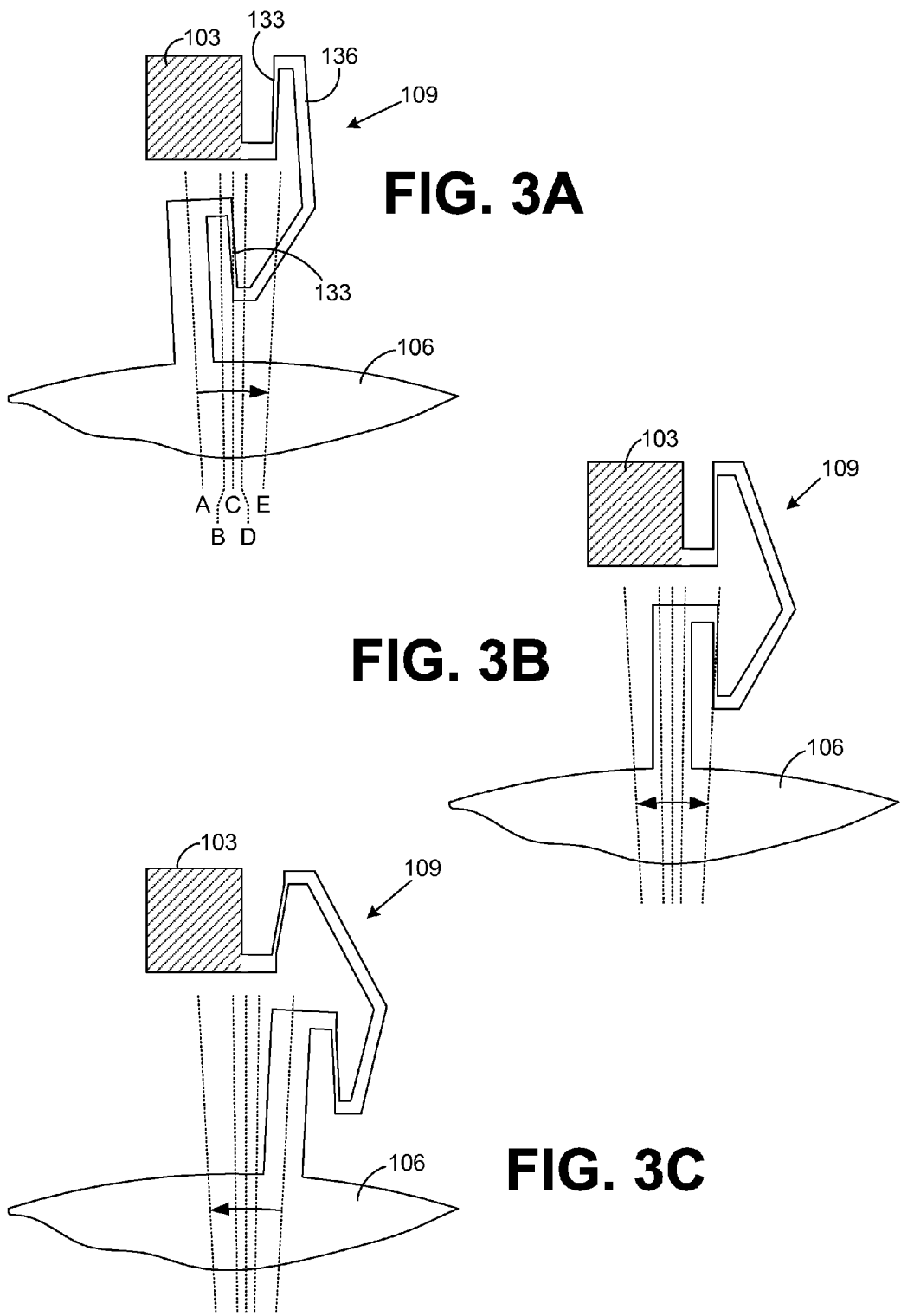
FIGS. 3A-3C are cutout views of one example of the compliant two-position mechanisms employed in the rotary motion system of FIG. 1 according to an embodiment of the present invention.

With reference to FIGS. 3A, 3B, and 3C, shown are various states of a compliant two-position mechanism 109 as employed, for example, with reference to the compliant rotary mechanism 100, (FIG. 1) described above. As shown, the compliant two-position mechanism 109 is comprised of two compliant beams 133 that are attached to a C-shaped beam 136. The width, length, and height of the compliant beams 133 generally determine the stiffness of the compliant two-position mechanism 109 in the various degrees of freedom of motion. In this respect, the compliant two-position mechanism 109 has characteristics of a spring at various points of motion as can be appreciated.

As shown with reference to FIG. 3A, the finger extended from the mass 106 that is coupled to one of the beams 133 is in position A. A force may be applied to the mass 106 that causes it to rotate, where the finger extension progresses through positions B, C, D, and ultimately to E, where it comes to rest. Positions A and E are both stable positions as the compliant two-position mechanism 109 is in a state of equilibrium in both positions A and E. Where the rotation of the mass 106 is allowed to occur throughout the entire motion of the compliant two-position mechanism 109 from position A through position E as shown above, then the two-position mechanism is properly termed a bi-stable mechanism as the compliant two-position mechanism 109 moves from a first stable state of equilibrium to a second stable state of equilibrium throughout its entire range of motion.

In example shown in FIG. 3A, positions A and E may coincide with the first and second angular positions 116 and 119 (FIG. 1) described above. Positions B and D are just to the right and left of the center position C and are termed "quasi-stable" positions as the compliant two-position mechanism 109 is in a quasi-stable state of equilibrium in such positions. In order to hold the compliant two-position mechanism 109 in one of the quasi-stable positions B or D, a stop mechanism or other means of impeding the progress of the rotation of the mass 106 is positioned such that the mass 106 buts up against the stop at one of the quasi-stable states B or D. In this respect, in position B or D. Such an abutment, stop, or other means of impeding the progress of the mass 106 is preferably placed so that the mass 106 travels from, for example, position A through position D, where the compliant two-position mechanism 109 has a tendency to want to force the mass 106 to continue rotating to position E when position D is reached. Conversely, the mass 109 may be configured to rotate from position E to position B in a similar manner. Thus, when the compliant two-position mechanism 109 is in positions B or D in a quasi-stable state of equilibrium, the compliant two-position mechanism 109 will have a tendency to force the mass 106 to rotate toward position A or E, respectively.

Assuming that the mass 106 rotates between A or E and position D or B, then when in position D or B, the compliant two-position mechanism 109 would need very little force to overcome the spring action that holds it into position at positions B or D against an appropriate stop or abutment in order to spring back to position A or E, respectively. In this respect, the compliant rotary mechanism 100 may be employed, for example, to sense vibration or other such mechanical force by being placed in a quasi-stable state of equilibrium at positions B or D, where very little vibration applied thereto would cause the mass 106 to rotate out of the quasi-stable state of equilibrium to the position A or E. In such embodiments, the first and second angular positions 116 and 119 (FIG. 1) may be considered to be, for example, positions A and D, or B and E, etc.

Still further, an abutment or stop may be placed against the mass 106 that will prevent its rotation through the center point C and effectively ends of the rotation of the mass 106 at one of the quasi-states of equilibrium at positions B or D. In this respect, the mass 106 may rotate from position A to position B and vice versa, or from position E to position D or vice versa. Since the compliant two-position mechanism 109 exerts a spring-like force against the mass 106 that may attempt to cause it to rotate back to positions A or E when in one of the quasi-stable states of equilibrium at positions B or D under these circumstances, then a counter force should be applied to ensure that the compliant two-position mechanisms 109 stay in the quasi-stable states B or D. Thus, the compliant two-position mechanism 109 may be employed in this context to be used as an "normally on" or "normally off" mechanism in which a force applied due to the actuation of the compliant rotary mechanism 100 causes the mass 106 to rotate up against an abutment at position B or D, and a loss of the actuation causes the mass 106 to rotate back to position A or E, respectively.

In any event, the first and second angular positions of the compliant rotary mechanism 100 may comprise any combination of the positions A, B, D, or E. In this respect, the first and second angular positions may comprise positions A and B, A and D, B and E, or D and E, or any other appropriate combination based upon the desired characteristics of the compliant rotary mechanism 100 for various applications. Also, it is noted that at position C, the compression force generated by the compliant two-position mechanism 109 is greatest as the couplings between the compliant beams 133 and the anchor/mass 106 are closest together. In this situation, there is a bias to move the compliant two-position mechanism 109 away from the center position where the compression is much less. It is in manipulating the characteristics that the stable and quasi-stable states of equilibrium of the compliant two-position mechanism 109 may be manipulated for various purposes depending on the particular application requirements. With reference to FIGS. 3B and 3C, shown is the compliant two-position mechanism 109 in positions C and E to illustrate the progress of the compliant two-position mechanism 109 throughout its full range of motion when used in a bi-stable configuration.

Figure 4:
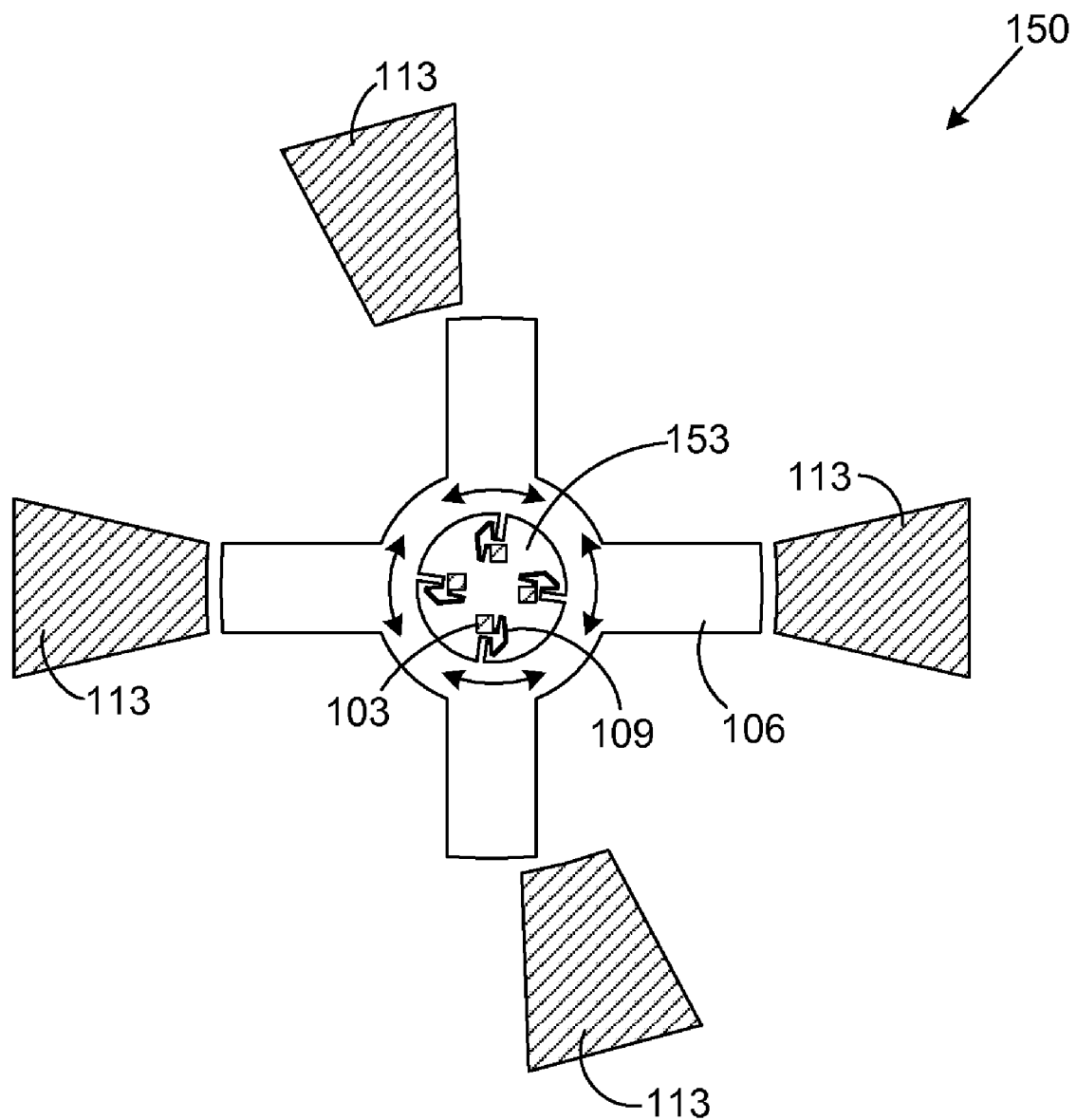
FIG. 4 is a drawing of a second example of a rotary motion system that includes a mass attached to a plurality of anchors using compliant two-position mechanisms according to an embodiment of the present invention.

With reference next to FIG. 4, shown is another example of a combined rotary mechanism 150 according to another embodiment of the present invention. The compliant rotary mechanism 150 differs from the compliant rotary mechanism 100 (FIG. 1) described above in that the compliant rotary mechanism 150 includes an internal opening 153 that is defined in the mass 106. While a single opening 153 is shown, it is understood that there might be multiple openings 153 within the mass 106. The compliant two-position mechanisms 109 are positioned inside the internal opening 153 defined in the mass 106.

According to one embodiment of the invention, the compliant two-position mechanisms 109 are placed within the opening 153 of the mass 106 and are arranged in a cyclically symmetrical geometry relative to the center of rotation of the mass 106. The cyclical symmetric geometry within which the compliant two-position mechanisms 109 are arranged may be established by placing the compliant two-position mechanisms 109 in a single internal opening 153 or within multiple internal openings 153. In this respect, the cyclical symmetric geometry is relative to the center of rotation of the mass and not relative to the shape of the internal opening 153 as can be appreciated. The compliant rotary mechanism 150 provides distinct advantages in that the finger extensions of the mass 106 may stretch for a significant distance and the rotary motion of the mass 106 by virtue of the compliant two-position mechanisms 109 may advantageously result in significant displacement of the mass 106 at the ends of the finger extensions. Such displacement may be useful for many purposes.

Figure 5:
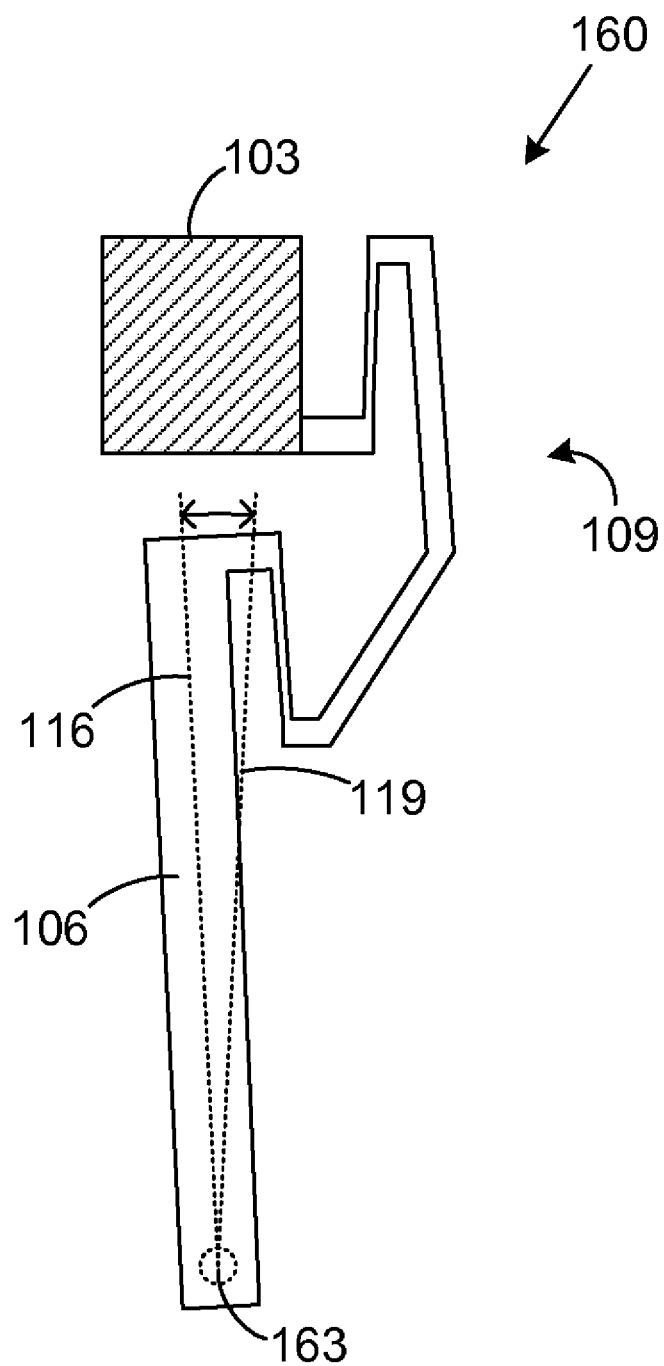
FIG. 5 is drawing of a third example of a rotary motion system that includes a mass attached to an anchor using a compliant two-position mechanism, the mass rotating about a pin joint according to an embodiment of the present invention.

With reference next to FIG. 5, shown is a compliant rotary mechanism 160 according to yet another embodiment of the present invention. The compliant rotary mechanism 160 differs from the compliant rotary mechanisms 100 (FIG. 1) and 150 (FIG. 4) described above, by virtue of the fact that the mass 160 rotates about a pivot point 163. In this respect, a pin may be fashioned in the mass 106 that fits into a hole in the substrate 130. The pin extending from the mass 106 and the hole in the substrate form a pin joint 163, where the rotation of the mass 106 is about the pin joint 163. Alternatively, a pin might be extended from the substrate and a hole might be created in the mass 106 to create the pin joint 163 as can be appreciated.

The mass 106 may be rotated from the first angular position 116 to a second angular position 119, where the first and second angular positions 116 and 119 may comprise positions A, B, D, or E as described above with reference to FIG. 3A. The compliant rotary mechanism 160 is advantageous in that only a single compliant two-position mechanism 109 is necessary to cause the desired rotation of the mass 106 as the mass 106 is constrained in other dimensions by the pin joint 163. In this respect, the compliant rotary mechanism 160 might not employ multiple compliant two-position mechanisms 109 arranged in a cyclically symmetric geometry relative to the center rotation of the mass 106, which in this case is the pivot joint 163. However, the compliant rotary mechanism 160 also includes drawbacks to the extent that manufacturing processes necessary to produce the pin joint 163 can be difficult and relatively expensive as compared to the manufacturing of the compliant rotary mechanisms 100 and 150 without pin joints 163. Also, the pin joint 163 is susceptible to failure do to wear and tear over lesser periods of time as compared to the life cycle of the compliant rotary mechanisms 100 and 150.

Figure 6:
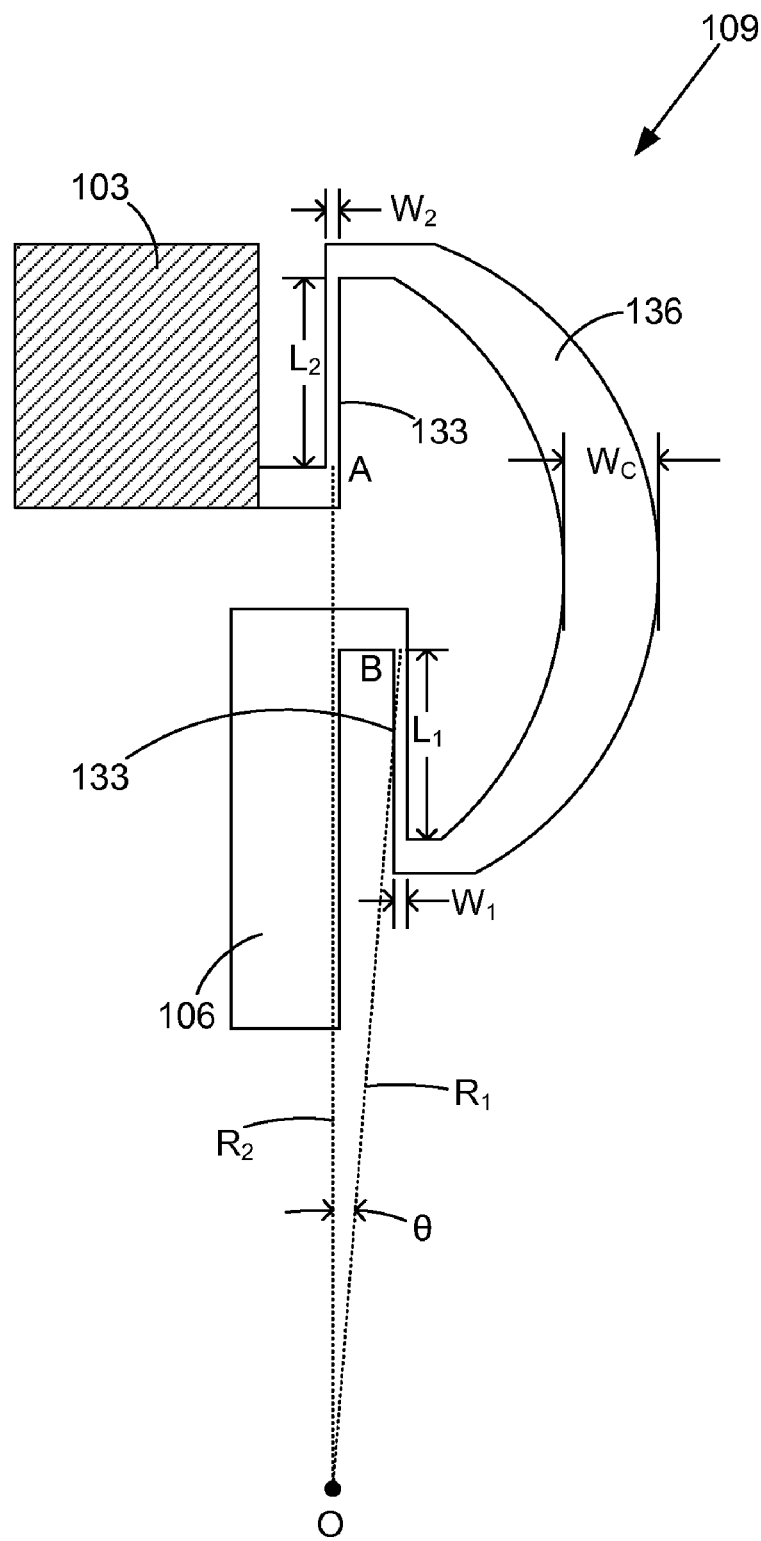
FIG. 6 is drawing of one example of a compliant two-position mechanism employed in the rotary motion systems of FIG. 1 according to an embodiment of the present invention.

Turning then to FIG. 6, shown is one example of a compliant two-position mechanism 109 that is used in an external configuration as depicted in FIG. 1 according to an embodiment of the present invention. As shown, the compliant two-position mechanism 109 includes the compliant beams 133 and the C-shaped beam 136. One of the compliant beams 133 is coupled to the mass at joint B, and a second one of the compliant beams 133 is connected to the anchor 103 at joint A. There are several design parameters that are taken into account when designing the compliant two-position mechanism 109 for use in a given compliant rotary mechanism 100, 150, 160, or in some other configuration. Specifically, the design parameters include the length $L_1$ or $L_2$ of the respective compliant beams 133, the width $W_1$ or $W_2$ of the respective compliant beams 133, or the height H (not shown) of the compliant beams 133. The height H is the dimension that is perpendicular to the plane within which the compliant two-position mechanism 109 appears in FIG. 6 as can be appreciated.

In addition, while the compliant two-position mechanism 109 shown in FIG. 6 is described as being of the type located outside an external perimeter of the mass 106 of the compliant rotary mechanism 100 as shown in FIG. 1, the same may be used in the compliant rotary mechanism 150 of FIG. 4 in which the compliant two-position mechanism 109 is located inside the internal opening 153 (FIG. 4) of the mass 106 as depicted in FIG. 4. However, in the case of the compliant rotary mechanism 150 of FIG. 4, the joint A is coupled to the mass 106, and the joint B is coupled to the anchor 103 as can be appreciated.

In addition, the design parameters of the compliant two-position mechanism 109 includes the radial distance $R_1$ or $R_2$ of the respective joints A or B from a center of rotation of the mass 106, denoted herein as center O. The radial distances $R_1$ and $R_2$ define an eccentricity angle θ and refer to the range of motion of the compliant two-position mechanism 109. The radial distances of $R_1$ and $R_2$ and the angular eccentricity θ associated with a given compliant two-position mechanism 109 are important parameters that effect the bi-stability of the compliant two-position mechanism 109 with respect to angular motion. In general, a high-angular eccentricity θ and a large radial distance of end B (i.e., $R_1$, where $R_1 < R_2$) improves bi-stability in the compliant two-position mechanism 109 with respect to rotational motion depending upon the given application of the compliant two-position mechanism 109.

In addition, the C-shaped beam 136 has a width $W_C$ that is specified to minimize any bending of the C-shaped beam 136. In this respect, the relative stiffness of the C-shaped beam 136 is designed to be greater so as to reduce its bending during any kind of motion. In this respect, adjustment of the spring stiffness of the C-shaped beam 136 may be performed in order to tune the overall stiffness of the compliant two-position mechanism 109, and the resulting compliant rotary mechanisms 100, 150, or 160 within which the compliant two-position mechanism 109 is employed.

The width $W_1/W_2$, length $L_1/L_2$, and height H of the compliant beams 133 are relatively important parameters that determine the spring stiffness of the compliant two-position mechanism 109 in various degrees of freedom of motion. In this respect, arranging multiple compliant two-position mechanisms 109 in a cyclical symmetric geometry about a center of rotation of a mass 106 advantageously constraints the mass 106 in all degrees of freedom except for in-plane rotational motion. This is seen in a specific example design in which $L_1=210$ μm; $L_2=80$ μm; W=5 μm; H=25 μm; $R_1=300$ μm; $R_2=400$ μm; θ=5°; and $W_C=20$ μm for an inside compliant rotary mechanism 150. In this respect, a modal analysis of such a sample design shows that the compliant rotary mechanism 150 is stiff in all other degrees of freedom of motion as compared to an in-plane rotational degree of freedom of motion. This is seen by calculating the resonant frequency relative to the spring stiffness of the mechanism by the following equation $$f_{res} = \frac{1}{2\pi}\sqrt{\frac{k}{m}},$$

where $f_{res}$ is a resonant frequency, k is the stiffness of the respective compliant rotary mechanism, and m refers to the mass. Given such parameters, Table 1 below relates the mode shape with respect to the undamped resonate frequency.

TABLE 1

| Mode Shape | Undamped Resonance Frequency (kHz) |
|---|---|
| In-plane rotation (Z-axis) | 1.43 |
| Out-of-plane rotation (X- and Y-axis) | 2.15 |
| Out-of-plane Linear (Z-axis) | 4.74 |
| In-plane Linear (X- and Y-axis) | 11.02 |

The fact that the undamped resonant frequency is smallest for the in-plane rotation around the axis of rotation of the mass 106 illustrates the constraint of all other degrees of freedom relative to the in-plane rotation. For further discussion of the compliant two-position mechanisms 109, reference is made to Masters, N. D. and Howell, L. L., "A Self-Retracting Fully Compliant Bistable Micromechanism," *Journal of Microelectromechanical Systems*, Vol. 12 (2003) 273-280, which is incorporated herein by reference.

Figure 7:
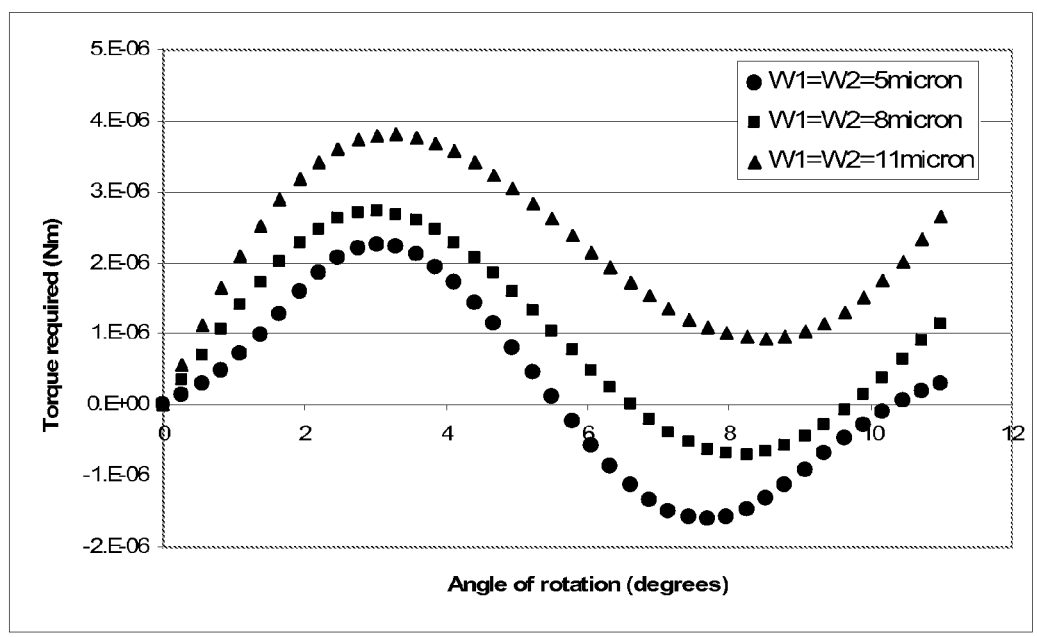
FIG. 7 is a graph that depicts torque v. angle of rotation for various example designs of rotary motion systems according to an embodiment of the present invention.

Referring next to FIG. 7, shown is a graph of the angle of rotation of one example of a compliant rotary mechanism 150 in which the compliant two-position mechanisms 109 are positioned external to a perimeter of the mass 106 with respect to the torque required to cause the rotation. The torque versus rotation behavior of the compliant rotary mechanism 150 is designed to be non-linear. As the mass 106 is rotated, the torque required approaches a critical value, when the mass 106 is in position C (FIG. 3A). Where the compliant rotary mechanism 150 is designed to be bi-stable, a bi-stability ratio may be defined as the ratio of energy needed to just reach the unstable equilibrium from the first and second stable positions. In the torque v. rotation graph of FIG. 7, a plot is made of the torque versus rotation for a compliant rotary mechanism 100, in which the compliant two-position mechanisms 109 are placed outside the mass 106 as depicted with reference to FIG. 1. Other design parameters taken into account in the plots of FIG. 7 are $L_1=L_2=300$ μm, $W_C=20$ μm, $H=20$ μm, $R_1=600$ μm, $R_2=750$ μm, and $\theta=5°$.

In addition, below are Tables 2 and 3 that provide examples of the various parameters for a given example designs of compliant rotary mechanisms 100 and 150.

TABLE 2

Sample Designs of Compliant Rotary Mechanisms 150*

| L1 (μm) | W1 (μm) | L2 (μm) | W2 (μm) | H (μm) | θ (°) | R1 (μm) | R2 (μm) | 2nd Stable Position (°) | Critical torque (μNm) | BSR |
|---|---|---|---|---|---|---|---|---|---|---|
| 210 | 5 | 80 | 5 | 20 | 10 | 300 | 425 | 17.6 | 0.78 | 0.02 |
| 210 | 4 | 80 | 4 | 20 | 10 | 300 | 425 | 18.7 | 0.1 | 0.28 |
| 180 | 4 | 80 | 4 | 20 | 10 | 250 | 375 | 18.7 | 0.11 | 0.30 |
| 190 | 5 | 40 | 5 | 20 | 7 | 290 | 410 | 13.5 | 0.14 | 0.03 |
| 190 | 5 | 40 | 5 | 25 | 7 | 290 | 410 | 13.5 | 0.18 | 0.03 |

*In all designs, $W_C$ is fixed at 20 μm

TABLE 3

Sample Designs of Compliant Rotary Mechanisms 100*

| L1 (μm) | W1 (μm) | L2 (μm) | W2 (μm) | H (μm) | θ (°) | R1 (μm) | R2 (μm) | 2nd Stable Position (°) | Critical torque (μNm) | BSR |
|---|---|---|---|---|---|---|---|---|---|---|
| 200 | 4 | 200 | 4 | 20 | 5 | 400 | 500 | 10.5 | 0.10 | 0.68 |
| 200 | 5 | 200 | 5 | 20 | 5 | 400 | 500 | 10.2 | 0.12 | 0.47 |
| 300 | 5 | 300 | 5 | 20 | 5 | 600 | 750 | 10.5 | 0.12 | 0.64 |
| 300 | 8 | 300 | 8 | 20 | 5 | 600 | 750 | 9.6 | 0.19 | 0.13 |

*In all designs, $W_C$ is fixed at 20 μm

The various embodiments of the compliant rotary mechanisms 100, 150, or 160 described herein may be employed for several applications. For example, they may be employed to control the flow of fluids as was described above. In addition, the compliant rotary mechanisms 100, 150, or 160 may be employed for optical switching where the displaced portions of a mass 106 are employed to selectively reflect or absorb laser radiation, etc. Still further, the compliant rotary mechanisms 100, 150, or 160 may be used as a simple switch or in the construction of micro-locks as can be appreciated. One skilled in the art may appreciate many more applications for the various embodiments of the compliant rotary mechanisms 100, 150, or 160 described herein.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A system, comprising:
   at least one anchor affixed to a substrate;
   a mass configured for rotary motion parallel to the substrate;
   a plurality of compliant two-position mechanisms attached to the mass and to the at least one anchor, wherein the compliant two-position mechanisms restrict the rotary motion of the mass from a first angular position to a second angular position;
   wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position; and
   wherein the at least one anchor, the mass, and the compliant two-position mechanisms together form a unitary structure.

2. The system of claim 1, wherein the system comprises a plurality of anchors, wherein the plurality of compliant two-position mechanisms are arranged in a cyclically symmetric geometry relative to a center of rotation of the mass.

3. The system of claim 1, wherein the mass is suspended over the substrate by the compliant two-position mechanisms.

4. The system of claim 1, wherein the compliant two-position mechanisms are positioned outside an external perimeter of the mass.

5. The system of claim 1, wherein the compliant two-position mechanisms are positioned in a layer that is adjacent to a layer within which the mass is suspended.

6. The system of claim 1, wherein each of the compliant two-position mechanisms is a micromechanism.

7. A system, comprising:
   at least one anchor;
   a mass configured for rotary motion;
   a plurality of compliant two-position mechanisms attached to the mass and to the at least one anchor, wherein the compliant two-position mechanisms restrict the rotary motion of the mass from a first angular position to a second angular position;
   wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position;

wherein the at least one anchor, the mass, and the compliant two-position mechanisms together form a unitary structure; and wherein the compliant two-position mechanisms are positioned inside an internal opening defined in the mass.

8. A system, comprising:

at least one anchor;

a mass configured for rotary motion;

a plurality of compliant two-position mechanisms attached to the mass and to the at least one anchor, wherein the compliant two-position mechanisms restrict the rotary motion of the mass from a first angular position to a second angular position;

wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position;

wherein the at least one anchor, the mass, and the compliant two-position mechanisms together form a unitary structure; and wherein a portion of the mass substantially covers at least one port when the mass is in the first angular position.

9. A system, comprising:

at least one anchor;

a mass configured for rotary motion;

a plurality of compliant two-position mechanisms attached to the mass and to the at least one anchor, wherein the compliant two-position mechanisms restrict the rotary motion of the mass from a first angular position to a second angular position;

wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position;

wherein the at least one anchor, the mass, and the compliant two-position mechanisms together form a unitary structure; and wherein the mass includes a pin that is compatible with a hole in a substrate, the pin and the hole forming a pin joint, and, the rotary motion of the mass is about the pin joint.

10. A system, comprising:

at least one anchor;

a mass configured for rotary motion;

a plurality of compliant two-position mechanisms attached to the mass and to the at least one anchor, wherein the compliant two-position mechanisms restrict the rotary motion of the mass from a first angular position to a second angular position;

at least two pairs of diametrically opposing posts that are positioned relative to corresponding fingers extending from the mass, wherein an actuation of the posts causes the mass to rotate from a first one of the first and second angular positions to a second one of the first and second angular positions;

wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position; and wherein the at least one anchor, the mass, and the compliant two-position mechanisms together form a unitary structure.

11. The system of claim 10, wherein a rotation of the mass is caused by a driver selected from the group consisting of a magnetic field, an electrostatic field, thermal expansion, surface tension, a chemical reaction, and a mechanical actuator.

12. The system of claim 10, wherein each of the compliant two-position mechanisms further comprises a pair of compliant beams, each of the compliant beams being coupled to an end of a C-shaped beam.

13. The system of claim 12, wherein the C-shaped beam is relatively stiffer than the compliant beams.

14. The system of claim 10, wherein the actuation creates a magnetic field that causes a magnetic flux path to be established from the posts toward the center of the mass.

15. A method, comprising the steps of:

suspending a mass above a substrate using a plurality of compliant two-position mechanisms attached to the mass and to at least one anchor protruding from the substrate;

generating a force that is applied to the mass that results in a rotational motion of the mass parallel to the substrate;

restricting the rotational motion between a first angular position and a second angular position based upon a compliance of the compliant two-position mechanisms;

rotating the mass from the first angular position to the second angular position;

wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position; and wherein the at least one anchor, the mass, and the compliant two-position mechanisms together form a unitary structure.

16. The method of claim 15, further comprising the step of arranging the compliant two-position mechanisms in a cyclically symmetric geometry relative to a center of rotation of the mass.

17. A method, comprising the steps of:

suspending a mass above a substrate using a plurality of compliant two-position mechanisms attached to the mass and to at least one anchor protruding from the substrate;

generating a force that is applied to the mass that results in a rotational motion of the mass;

restricting the rotational motion between a first angular position and a second angular position based upon a compliance of the compliant two-position mechanisms;

substantially covering at least one port with a portion of the mass when the mass is in the first angular position;

rotating the mass from the first angular position to the second angular position;

wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position; and wherein the at least one anchor, the mass, and the compliant two-position mechanisms together form a unitary structure.

18. A system, comprising:
- at least one anchor affixed to a substrate;
- a mass configured for rotary motion parallel to the substrate;
- a plurality of compliant two-position mechanisms attached to the mass and to the at least one anchor, wherein the compliant two-position mechanisms restrict the rotary motion of the mass from a first angular position to a second angular position;
- means for driving a rotation of the mass from the first angular position to the second angular position;
- wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position; and
- wherein the at least one anchor, the mass, and the compliant two-position mechanisms together form a unitary structure.

19. A method, comprising the steps of:
- suspending a mass above a substrate using a plurality of compliant two-position mechanisms attached to the mass and to at least one anchor protruding from the substrate;
- generating a force that is applied to the mass that results in a rotational motion of the mass;
- restricting the rotational motion between a first angular position and a second angular position based upon a compliance of the compliant two-position mechanisms;
- rotating the mass from the first angular position to the second angular position;
- wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position;
- wherein the at least one anchor, the mass, and the compliant two-position mechanisms together form a unitary structure; and
- wherein the force is generated by an actuation of at least one pair of diametrically opposing posts, the center of the mass is positioned between the at least one pair of diametrically opposing posts, and a magnetic flux path is established from the posts toward the center of the mass.

20. A system, comprising:
- at least one anchor;
- a mass configured for rotary motion;
- a plurality of compliant two-position mechanisms attached to the mass and to the at least one anchor, wherein the compliant two-position mechanisms restrict the rotary motion of the mass from a first angular position to a second angular position;
- wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position;
- wherein the at least one anchor, the mass, and the compliant two-position mechanisms together form a unitary structure; and
- wherein each of the compliant two-position mechanisms is in a quasi stable state of equilibrium when the mass is in a third angular position between the first angular position and the second angular position.

21. A system, comprising:
- at least one anchor;
- a mass configured for rotary motion;
- a plurality of compliant two-position mechanisms attached to the mass and to the at least one anchor, wherein the compliant two-position mechanisms restrict the rotary motion of the mass from a first angular position to a second angular position;
- wherein each of the compliant two-position mechanisms is a bi-stable mechanism, the bi-stable mechanism being in a first stable state of equilibrium when the mass is in the first angular position, and the bi-stable mechanism being in a second stable state of equilibrium when the mass is in the second angular position;
- wherein the at least one anchor, the mass, and the compliant two-position mechanisms together form a unitary structure; and
- wherein each of the compliant two-position mechanisms is held in an unstable state when the mass is in a third angular position between the first angular position and the second angular position and the mass abuts against a stop.

22. The system of claim 21, wherein each of the compliant two-position mechanisms is held in the unstable state by a force applied by an actuation of at least one pair of diametrically opposing posts, the center of the mass is positioned between the at least one pair of diametrically opposing posts, and a magnetic flux path is established from the posts toward the center of the mass.

* * * * *